United States Patent
Miwa et al.

(10) Patent No.: US 7,404,289 B2
(45) Date of Patent: Jul. 29, 2008

(54) VEHICULAR CONTROL DEVICE

(75) Inventors: Koji Miwa, Susono (JP); Ikuo Ando, Toyota (JP); Ryuta Teraya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/372,201

(22) Filed: Mar. 10, 2006

(65) Prior Publication Data
US 2006/0218894 A1     Oct. 5, 2006

(30) Foreign Application Priority Data
Mar. 29, 2005   (JP)   ............... 2005-095262

(51) Int. Cl.
*F01N 3/00*   (2006.01)
(52) U.S. Cl. .............. 60/285; 60/284; 60/286; 180/65.2; 180/65.4
(58) Field of Classification Search ............ 60/274, 60/280, 284, 285, 286; 180/65.2, 65.3, 65.4
See application file for complete search history.

(56) References Cited
U.S. PATENT DOCUMENTS

| | | | |
|---|---|---|---|
| 5,416,710 A | * 5/1995 | Kuroda et al. | 701/104 |
| 5,724,952 A | * 3/1998 | Miyashita et al. | 123/688 |
| 5,743,082 A | * 4/1998 | Matsumoto et al. | 60/274 |
| 6,173,569 B1 | * 1/2001 | Kusada et al. | 60/277 |
| 6,405,527 B2 | * 6/2002 | Suzuki et al. | 60/285 |
| 6,792,750 B2 | 9/2004 | Nagai et al. | |
| 7,152,395 B2 | * 12/2006 | Inoue et al. | 60/286 |

FOREIGN PATENT DOCUMENTS

| | | |
|---|---|---|
| EP | 1 128 042 A2 | 8/2001 |
| EP | 1 291 510 A2 | 3/2003 |
| JP | A 06-307271 | 11/1994 |
| JP | A 2002-303129 | 10/2002 |
| JP | A 2003-083121 | 3/2003 |
| JP | A-2003-083121 | 3/2003 |
| JP | A 2004-116320 | 4/2004 |
| RU | 2094624 | 10/1997 |

\* cited by examiner

*Primary Examiner*—Binh Q. Tran
(74) *Attorney, Agent, or Firm*—Oliff & Berridge, PLC (57) ABSTRACT

An engine ECU executes a program including the steps of: if it is necessary to take an anti catalytic odor approach and the engine should be warmed up, resetting an engine warm up request flag to cut fuel for the approach; cutting the fuel and determining whether the approach has completed; and if so, setting the flag.

22 Claims, 8 Drawing Sheets

VEHICULAR CONTROL DEVICE

This nonprovisional application is based on Japanese Patent Application No. 2005-095262 filed with the Japan Patent Office on Mar. 29, 2005, the entire contents of which are hereby incorporated by reference.

BACKGROUND OF THE INVENTION

1. Field of the Invention

The present invention relates generally to controlling vehicles at least having an internal combustion engine mounted therein, and particularly to vehicular control devices reducing catalytic odor present in emissions cleaned by a catalyst and then emitted into the air.

2. Description of the Background Art

Emissions from an engine serving as a source driving a vehicle contain air pollutants including carbon monoxide (CO) generated when fuel incompletely combusts, hydrocarbon (HC) resulting from fuel failing to combust and having evaporated, and nitrogen oxide (NOx) bound to nitrogen and oxide present in the air internal to a combustion chamber having high temperature. These substances affect environment, and accordingly they must be removed before they are emitted into the air. This is addressed by providing an exhaust pipe at an intermediate portion with a catalytic converter. This catalytic converter employs platinum and rhodium or palladium and rhodium plus palladium as a catalyst. These elements react with the three types of air pollutants to provide carbon dioxide ($CO_2$), water ($H_2O$) and nitrogen ($N_2$). As the catalytic converter causes the three types of chemical substances to react, it is also referred to as a three way catalyst.

If for such a catalytic converter 1) the catalyst has high temperature, 2) the vehicle is in a small load range having a small amount of exhaust gas (i.e., a small amount of air is taken in), and 3) an air fuel ratio having been controlled is rich on average, then the catalytic converter internally has a reducing atmosphere and catalytic odor is caused. More specifically, fuel contains sulfur (S), which is oxidized to be SOx which in turn adheres to the catalyst and when the above three conditions are satisfied the reducing atmosphere is provided and therein the absorbed SOx is reduced to generate a sulfuric odor (hydrogen sulfide ($H_2S$)). More specifically, a catalytic odor attributed to a sulfuric compound contained in fuel is caused as hydrogen sulfide is generated by the following reaction:

$$SO_2 + 3H_2 \rightarrow H_2S + 2H_2O.$$

More specifically, hydrogen sulfide is generated presumably because the fuel has a sulfuric component combusted and thus becoming sulfur dioxide gas, which in turn reacts with hydrogen generated during a combustion process.

Such catalytic odor attributed to the fact that the fuel has such a property (or contains a sulfuric component) is more significantly caused for richer average air fuel ratios, as has been described above. For leaner air fuel ratios, the following reaction:

$$2SO_2 + O_2 \rightarrow 2SO_3$$

$$6SO_3 + 4CeO_2 \rightarrow 2Ce_2(SO_4)_3 + O_2$$

presumably provides a sulfur oxide which is in turn absorbed by the catalyst.

Furthermore for richer air fuel ratios oxygen exists in a small amount and such oxygen binds to hydrogen to generate $H_2O$. However, as the oxygen exists in the small amount, hydrogen is excessively generated and binds to sulfur. This helps to generate $H_2S$, which is also considered as an obstacle in reducing catalytic odor. For leaner air fuel ratios, oxygen exists in a large amount and such oxygen binds to hydrogen and thus helps to generate $H_2O$. Hydrogen is less excessively generated and accordingly so is $H_2S$, which presumably reduces catalytic odor.

In a point of view different from such catalytic (or bad) odor, the three way catalyst has a cleaning characteristic depending on an air fuel ratio of an air fuel mixture formed in a combustion chamber and when the air fuel ratio is close to a stoichiometric air fuel ratio the three way catalyst functions most effectively. This is because when an air fuel ratio is lean and exhaust gas has a large amount of oxygen, oxidation is enhanced in activity however reduction is reduced in activity, and when an air fuel ratio is rich and exhaust gas has a small amount of oxygen, reduction is enhanced in activity however oxidation is reduced in activity, and as a result the above mentioned three harmful components cannot all be cleaned satisfactorily. Accordingly, internal combustion engines having a three way catalyst have an exhaust manifold provided with a linear oxygen sensor measuring an oxygen concentration which is in turn used to feed back the combustion chamber's internal air fuel mixture to control it to achieve the stoichiometric air fuel ratio.

It is generally known that a three way catalyst is provided with a capability to store oxygen (or an oxygen storage) to prevent the three way catalyst from providing impaired emission cleaning performance if an air fuel mixture temporarily has a lean or rich air fuel ratio. Thus for the lean air fuel ratio excessive oxygen is stored and for the rich air fuel ratio the stored oxygen is used to maintain satisfactory emission cleaning performance.

More specifically, the three way catalyst has a function taking in and storing excessive oxygen present in exhaust gas for the lean air fuel ratio to reduce NOx. In contrast, when an air fuel ratio becomes rich, HC and CO filling to combust and thus present in exhaust gas deprive the three way converter of the oxygen stored therein and are thus oxidized. Accordingly, when an air fuel ratio deviates from the stoichiometric air fuel ratio and NOx is accordingly to be reduced the three way catalyst must be in a condition capable of storing oxygen (i.e., the three way catalyst must store oxygen in an amount that has a sufficient margin relative to a maximum oxygen occlusion), and in contrast, to oxidize uncombusted CH and CO the three way catalyst must store an amount of oxygen sufficient.

To be able to reduce NOx for an air fuel ratio deviating from the stoichiometric air fuel ratio to a lean air fuel ratio and oxidize uncombusted HC and CO for an air fuel ratio deviating from the stoichiometric air fuel ratio to a rich air fuel ratio the three way catalyst preferably has an oxygen occlusion maintained to correspond to approximately half a maximum oxygen occlusion.

There exists a well-known hybrid vehicle having mounted therein an internal combustion engine having a stop mode when the vehicle is running, and an electric motor. In such hybrid vehicle the engine is stopped depending on the vehicle's state of operation, a driving battery's state, and the like, and such states thereafter are also detected and the engine is restarted, as required, to enhance fuel economy. Thus the engine is intermittently operated (or stopped by interrupting (or cutting) the fuel supplied thereto) to achieve enhanced fuel economy. When the vehicle is operated and the engine stops, and an electronic control unit (ECU) determines that the engine stops, the fuel supplied to the engine is immediately interrupted (or cut). While the engine is prevented from receiving the fuel, the engine still has an inertial force and its crankshaft's rotation does not immediately stop. As the crankshaft rotates, intake and exhaust valves open and close and the engine accordingly takes in air, however the engine is not supplied with fuel and its emissions are lean. In that case, as the fuel is cut, the three way catalyst readily reaches its limit in oxygen occlusion, and cannot exhibit a desired catalytic cleaning performance when the engine is restarted.

Japanese Patent Laying-Open No. 2003-083121 discloses a catalytic emission cleaner for an internal combustion engine that can address such disadvantage utilize an emission cleaning catalyst's oxygen occlusion capability to provide further enhanced emission cleaning performance. As disclosed in the publication, the emission cleaner utilizes an oxygen occlusion effect of an emission cleaning catalyst arranged on an emission path of the internal combustion engine having an engine stop mode stopping the engine when the vehicle is operated. The emission cleaner includes a calculator calculating the catalyst's oxygen occlusion, and an air fuel ratio controller driven by the calculated oxygen occlusion to control the internal combustion engine's air fuel ratio. The calculator also calculates oxygen occlusion in the engine stop mode and air fuel ratio controller is driven by the oxygen occlusion calculated by the calculator in the engine stop mode to control an air fuel ratio after the mode is cleared when the engine restarts.

This catalytic emission cleaner allows oxygen occlusion to be also calculated in the engine stop mode and allows an air fuel ratio after the engine's restart to be controlled as based on oxygen occlusion capability. This can reduce the deterioration in emission cleaning performance that is provided immediately after the engine is restarted, and thus provided further enhanced emission cleaning performance. Herein controlling an air fuel ratio immediately after the engine's restart how the air fuel ratio varies within a predetermined period of time can be determined to prevent emission cleaning performance from significantly deteriorating immediately after the engine is restarted restart and thus provide further enhanced emission cleaning performance.

The above publication discloses that the three way catalyst's oxygen occlusion is controlled by modifying the engine's output and the motor's output in ratio, cutting the fuel helps oxygen occlusion to reach a limit, and that while the fuel is cut the motor must output all of torque required for the vehicle. The publication is, however, silent on catalytic odor. More specifically, if with the fuel cut the engine is restarted regardless of catalytic odor reduction control, the engine can emit rich exhaust gas, and as described above, in such rich condition a catalytic odor ($H_2S$) can be generated disadvantageously.

SUMMARY OF THE INVENTION

The present invention has been made to resolve the above disadvantage and it contemplates a vehicular control device provided for a vehicle at least having an internal combustion engine as a driving source, that can reduce catalytic odor if the engine is operated in a changed manner when fuel supplied to the engine is interrupted (or cut) while the vehicle is operated. The present invention also contemplates a vehicular control device reducing catalytic odor generated when a stopped vehicle is required to be operated at idle.

The present invention in one aspect provides a vehicular control device controlling a vehicle having mounted therein an internal combustion engine with an exhaust manifold provided with a catalytic device cleaning emissions. The present vehicular control device includes: a fuel supplier supplying the internal combustion engine with fuel; a detector detecting that the catalytic device generates catalytic odor and/or a prediction that the catalytic device generates the catalytic odor; an interrupter temporarily interrupting the fuel supplied from the fuel supplier; and a controller controlling the vehicle, as based on whether the interrupter's temporal interruption of the fuel is attributed to the catalytic odor.

When the catalytic device achieves a rich air fuel ratio it can generate a catalytic odor ($H_2S$) and accordingly the catalytic odor must be reduced. In the present invention if the detector detects that such catalytic odor is generated or a prediction that such catalytic odor will be generated, the fuel supplied to the internal engine is temporarily interrupted (or cut) (to reduce or prevent the catalytic odor). This can provide a lean air fuel ratio and thus reduce or prevent the catalytic odor. Conventionally for example when an internal combustion engine is operated for warm up or idle speed control (ISC) learning control is incomplete, cutting the fuel is prohibited and consequently catalytic odor is generated. Accordingly in the present control device if catalytic odor is generated or predicted and the interrupter temporarily interrupts (or cuts) the fuel supplied to the engine the controller rejects other request (in the above described example, a request to prohibit temporarily stopping the fuel supplied to the engine) and controls the internal combustion engine. Thus the catalytic device can achieve a lean air fuel ratio and the catalytic odor can be reduced or prevented. Consequently, if a vehicle at least having an internal combustion engine as a driving source is in operation and the fuel supplied to the internal combustion engine is interrupted (or cut), and there is a change in a manner of operation of the internal combustion engine, the present vehicular control device can reduce or prevent catalytic odor.

Preferably the vehicular control device further includes a determinator determining whether the internal combustion engine should be warmed up. If the determinator determines that the internal combustion engine should be warmed up and temporarily interrupting the fuel is accordingly prohibited, and the interrupter on the other hand currently, temporarily interrupts the fuel, the controller controls the internal combustion engine to prioritize the interrupter temporarily interrupting the fuel.

When the internal combustion engine is being warmed up, prohibiting cutting the fuel causes catalytic odor. In accordance with the present invention if the catalytic odor is caused or predicted and the interrupter accordingly cuts the fuel, the controller rejects a request that cutting the fuel should be prohibited for warming up the engine, and controls the internal combustion engine. Thus the catalytic device can achieve a lean air fuel ratio and the catalytic odor can be reduced or prevented.

Still preferably the controller controls the internal combustion engine to prioritize the interrupter temporarily interrupting the fuel and delay resupplying the internal combustion engine with the fuel.

In accordance with the present invention, if catalytic odor is caused or predicted and the interrupter cuts the fuel, the controller can rejects a request that cutting the fuel should be prohibited for warming up the engine, and controls the internal combustion engine to delay resupplying the internal combustion engine with the fuel. Thus the catalytic device can achieve a lean air fuel ratio and the catalytic odor can thus be reduced or prevented.

Still preferably the determinator determines whether the internal combustion engine should be warmed up from a temperature of a coolant of the internal combustion engine.

In accordance with the present invention whether the internal combustion engine should be warmed up can be determined by the temperature of a coolant of the internal combustion engine.

Still preferably, the interrupter temporarily interrupts the fuel a predetermined period of time after a condition for interrupting the fuel is established, and if the interrupter's temporary interruption of the fuel is attributed to the catalytic odor, the controller controls the internal combustion engine to reduce the predetermined period of time to be shorter than when the interrupter's temporary interruption of the fuel is not attributed to the catalytic odor.

If the fuel supplied to the internal combustion engine is cut immediately after a condition for cutting the fuel is established, then, cutting the fuel is started for example with the electronic throttle valve open at a large angle (or a large amount of air taken in) or with the internal combustion engine at high speed. This can causes noise and vibration (NV). Accordingly, conventionally, the fuel is cut a predetermined period of time (or a delay time) after the condition for cutting the fuel is established. In the present control device the controller varies this period of time between cutting the fuel due to catalytic odor and doing so for a different reason. More specifically, if the catalytic odor is generated or predicted and accordingly the fuel is cut, then between the establishment of the condition for cutting the fuel and actually cutting the fuel a reduced delay time is introduced. The electronic throttle valve can be opened at a large angle and the internal combustion engine also has high speed, and a large amount of air can be taken into the internal combustion engine. As a result the catalytic device can rapidly achieve a lean air fuel ratio.

Still preferably, the vehicular control device further includes an estimator estimating a degree in degradation of the catalytic device, and if the interrupter's temporary interruption of the fuel is attributed to the catalytic odor, the predetermined period of time is set to be shorter for a smaller degree in degradation of the catalytic device.

A more fresh (or less degraded) catalyst is more capable of storing a sulfuric (S) component. In accordance with the present invention between the establishment of the condition for cutting the fuel and actually cutting the fuel a further reduced delay time can be introduced to more firmly and rapidly reduce or prevent the catalytic odor.

Still preferably the controller controls the internal combustion engine to delay the engine's halt if the interrupter's temporary interruption of the fuel is attributed to the catalytic odor.

In accordance with the present invention for example if an instruction is issued to stop the internal combustion engine the fuel supplied to the internal combustion engine is cut and a dynamo-electric machine (or motor generator) connected to the internal combustion engine also generates power and the internal combustion engine is decreased in speed. If the vehicle is thus controlled, and catalytic odor is caused or predicted and accordingly the fuel is cut (to reduce or prevent the catalytic odor), decreasing the internal combustion engine in speed is delayed to delay stopping the internal combustion engine. This can increase a period of time for which the internal combustion engine rotates without receiving the fuel. The catalytic device can achieve a leaner air fuel ratio and the catalytic odor can be reduced or prevented.

Still preferably the controller controls a dynamo-electric machine to delay the internal combustion engine's halt.

In accordance with the present invention when the internal combustion engine is stopped a dynamo-electric machine (or motor generator) generating a torque stopping the internal combustion engine from rotating reduces the internal combustion engine in speed. The motor generator can be controlled to delay stopping the internal combustion engine. This can increase a period of time for which the internal combustion engine rotates without receiving the fuel. The catalytic device can achieve a leaner air fuel ratio and the catalytic odor can be reduced or prevented.

Still preferably, the vehicular control device further includes an air detector detecting an amount of air taken into the internal combustion engine, and the controller controls the internal combustion engine to delay the engine's halt in accordance with the amount.

In accordance with the present invention while the fuel supplied to the engine is cut an amount of air taken into the engine as it is rotated is calculated and stopping the internal combustion engine is delayed until the calculated mount of air can sufficiently reduce or prevent catalytic odor to ensure that the catalytic odor is reduced or prevented.

Still preferably the controller controls the internal combustion engine to delay the engine's halt until the amount of air accumulated over time exceeds a predetermined value.

In accordance with the present invention while the fuel supplied to the engine is cut a cumulative value of an amount of air taken into the engine over time as it is rotated is calculated and stopping the internal combustion engine is delayed until a decision can be made that the cumulative value is sufficient to reduce or prevent catalytic odor to ensure that the catalytic odor can be reduced or prevented.

Still preferably the interrupter temporarily interrupts the fuel until the catalytic odor is no longer generated.

In accordance with the present invention the fuel supplied to the engine is cut until a sufficiently lean air fuel ratio can be achieved so that catalytic odor is no longer generated to ensure that the catalytic odor can be reduced or prevented.

The present invention in another aspect provides a vehicular control device controlling a vehicle having mounted therein an internal combustion engine with an exhaust manifold provided with a catalytic device cleaning emissions and a dynamo-electric machine connected to the internal combustion engine to generate a torque stopping the internal combustion engine from rotating. The present vehicular control device includes: a detector detecting that the catalytic device generates catalytic odor and/or a prediction that the catalytic device generates the catalytic odor; and a controller operative in response to the catalytic odor to control the vehicle to rotate the internal combustion engine by the dynamo-electric machine after the engine halts.

When the catalytic device attains a rich air fuel ratio a catalytic odor ($H_2S$) can be caused and accordingly must be reduced or prevented. Conventionally if a detector detects that the catalytic odor is generated or a prediction that the catalytic odor will be generated, and there is also an instruction to operate the internal combustion engine at idle, the internal combustion engine remains idle. As such, if immediately therebefore the fuel supplied to the engine is increased in amount for correction, and the engine is then operated at idle, catalytic odor is generated. If the catalytic odor is caused or predicted and an instruction is accordingly issued to operate the internal combustion engine at idle (to reduce or prevent the catalytic odor), the present control device has the controller stopping the internal combustion engine and allowing the dynamo-electric machine to rotate the internal combustion engine to introduce air into the internal combustion engine to vary from rich to lean, and then starting and operating the internal combustion engine at idle. Thus the catalytic device can achieve a lean air fuel ratio and the catalytic odor can be reduced or prevented. As a result, for example if the fuel supplied to the engine is increased in amount for correction and the vehicle is thereafter stopped, and an idle operation is also requested, the vehicular control device can reduce or prevent catalytic odor.

Preferably the controller controls the vehicle to rotate the internal combustion engine by the dynamo-electric machine for at least a predetermined period of time.

In accordance with the present invention the internal combustion engine can be rotated by the dynamo-electric machine for at least a predetermined period of time. A sufficient amount of air can be taken into the internal combustion engine to ensure that catalytic odor is prevented.

Still preferably the vehicular control device further includes a determinator determining whether the internal combustion engine should be warmed up and the controller controls the vehicle to start and warm up the engine after rotating the engine by the dynamo-electric machine if the determinator determines that the engine should be warmed up.

In accordance with the present invention if the internal combustion engine should be warmed up, then after the internal combustion engine is stopped the dynamo-electric machine can rotate the internal combustion engine to allow the catalytic device to achieve a lean air fuel ratio to reduce or prevent catalytic odor and then the internal combustion engine can be started, and operated at idle and thus warmed up. Thus catalytic odor can be prevented.

Still preferably the detector detects that the catalytic device generates the catalytic odor and/or the prediction when fuel supplied to the internal combustion engine is increased in amount for correction.

In accordance with the present invention if the internal combustion engine is supplied with fuel increased in amount for example to cause the internal combustion engine to provide an increased output, the catalytic device attains a rich air fuel ratio and hence cause catalytic odor, and the detector can detect that the catalytic device generates catalytic odor or a prediction that the catalytic device will do so.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe the present invention in embodiments. In the following description, identical components are identically denoted. They are also identical in name and function.

First Embodiment

Figure 1:
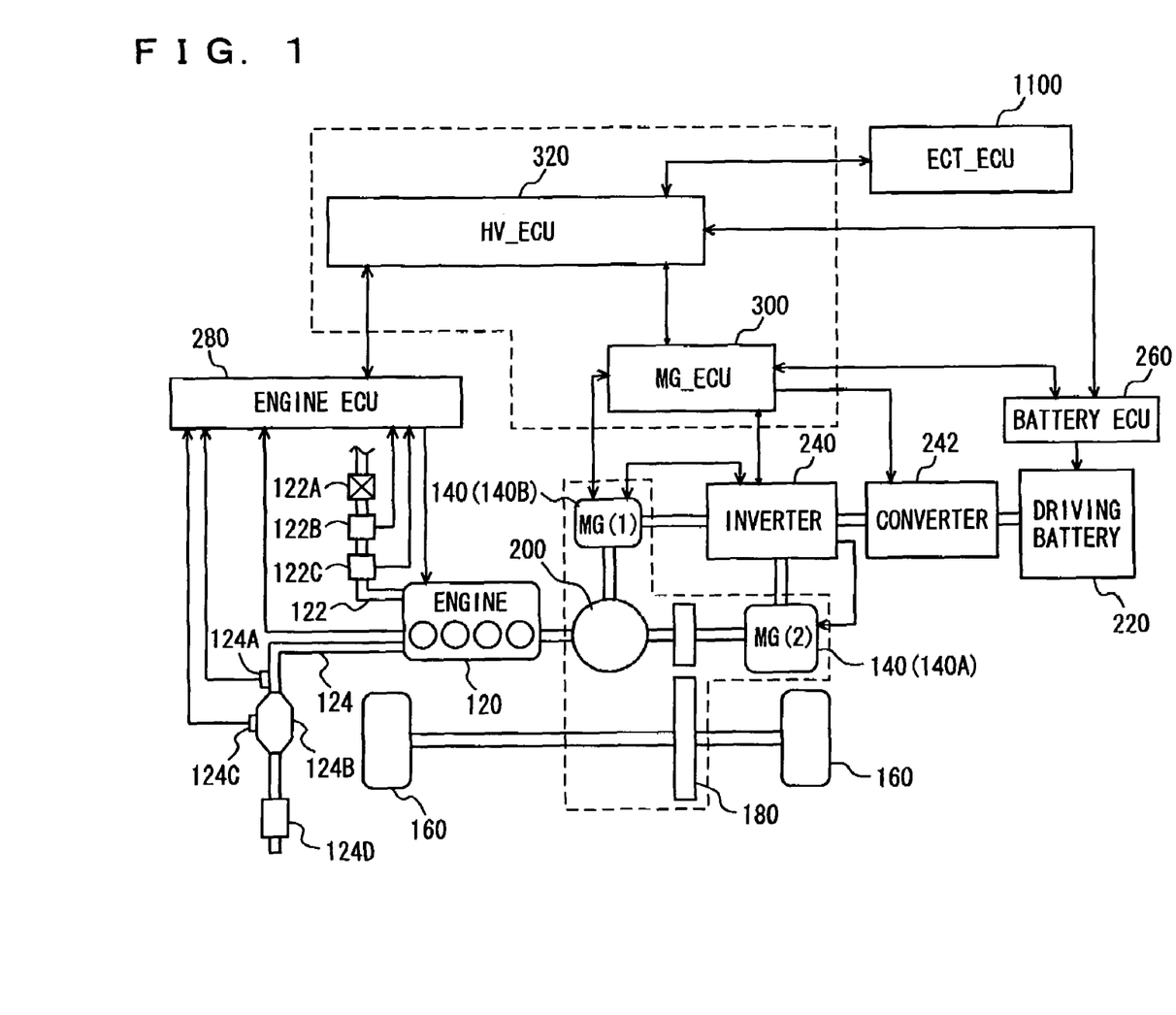
FIG. 1 is a block diagram for illustrating controlling a hybrid vehicle in a first embodiment of the present invention.

FIG. 1 is a block diagram for illustrating controlling a hybrid vehicle to which a control device in the present embodiment is applied. Note that the present invention is not limited to the hybrid vehicle shown in FIG. 1 and may be applied to hybrid vehicles having different fashions. Furthermore, the present invention may be applied to electric vehicles and fuel cell vehicles. Furthermore, the present invention may be applied to a capacitor or a similar power storage mechanism, rather than a driving battery.

The hybrid vehicle includes a driving source implemented for example by a gasoline engine, a diesel engine or a similar internal combustion engine (hereinafter also simply referred to as "engine") 120 and a motor generator (MG) 140. Note that while in FIG. 1, for the sake of illustration, motor generator 140 is represented as a motor 140A and a generator 140B (or motor generator 140B), motor 140A acts as a generator and generator 140B acts as a motor depending on how the hybrid vehicle runs.

Engine 120 connects to an intake manifold 122 provided with an air cleaner 122A capturing dust present in air taken in, an air flow meter 122B detecting an amount of air taken through air cleaner 122A into engine 120, and an electronic throttle valve 122C serving as a valve for adjusting an amount of air taken into engine 120. Electronic throttle valve 122C is provided with a throttle position sensor. An engine ECU 280 receives the amount of air as detected by air flow meter 122B, an angle of electronic throttle valve 122C as detected by the throttle position sensor, and the like.

Engine 120 also connects to an exhaust manifold 124 provided with a three way catalyst 124B, an air fuel ratio sensor 124A detecting an air fuel ratio (A/F) of emission introduced into three way catalyst 124B, a catalyst temperature sensor 124C detecting three way catalyst 124B in temperature, and a muffler 124D. Engine ECU 280 receives the air fuel ratio of the emission introduced into three way catalyst 124B, as detected by air fuel ratio sensor 124A, the temperature of three way catalyst 124B as detected by catalyst temperature sensor 124C, and the like.

Note that air fuel ratio sensor 124A is a full range (or linear) air fuel ratio sensor generating an output voltage proportional to an air fuel ratio of an air fuel mixture combusted in engine 120. Note that air fuel ratio sensor 124A may be an $O_2$ sensor sensing and representing in an on/off manner whether an air fuel mixture combusted in engine 120 has a rich or lean air fuel ratio relative to a stoichiometric air fuel ratio. Furthermore, engine ECU 280 receives a signal indicative of the temperature of a coolant for engine 120 from a sensor detecting it.

The hybrid vehicle also includes a reduction gear 180 receiving power generated by engine 120 and motor generator 140 and transferring the power to a driving wheel 160, and transmitting the driving of driving wheel 160 to engine 120 and motor generator 140, a power split device (e.g., a planetary gear mechanism) 200 splitting power generated by engine 120 and distributing the power to two paths corresponding to driving wheel 160 and generator 140B, a driving battery 220 charged with power for driving motor generator 140, an inverter 240 converting a direct current of driving battery 220 and an alternate current of motor 140A and generator 140B to control a current, a battery control unit (hereinafter referred to as battery electronic control unit or battery ECU) 260 controlling how driving battery 220 is charged and discharged, engine ECU 280 controlling how engine 120 is operated, an MG_ECU 300 controlling motor generator 140 and battery ECU 260, inverter 240 and the like in accordance with the hybrid vehicle's state, an HV_ECU 320 controlling battery ECU 260, engine ECU 280, MG_ECU 300 and the like mutually to generally control a hybrid system to allow the hybrid vehicle to be most efficiently operated, and the like.

In the present embodiment between driving battery 220 and inverter 240 a converter 242 is provided, since driving battery 220 has a rated voltage lower than motor 140A and motor generator 140B, and accordingly when driving battery 220 supplies motor 140A and motor generator 140B with power converter 242 up converts the power. Converter 242 has a smoothing capacitor incorporated therein and electrically charged when converter 242 performs an up conversion operation.

While in FIG. 1 each ECU is separately configured, two or more ECUs may be integrated together. (For example, as indicated in FIG. 1 by a dotted line, MG_ECU 300 and HV_ECU 320 are integrated together by way of example).

Power split device 200 employs a planetary gear to split and thus distribute power of engine 120 to both of driving wheel 160 and motor generator 140B. By controlling motor generator 140B in rate of rotation, power split device 200 also acts as a continuously variable transmission. As engine 120 rotates, it produces torque which is in turn received by a planetary carrier (C) and then transferred by a sun gear (S) to motor generator 140B and by a ring gear (R) to a motor and an output shaft (toward driving wheel 160). In stopping the rotating engine 120, the rotating engine 120 has kinetic energy, which is converted by motor generator 140B to electrical energy to reduce engine 120 in speed.

When the hybrid vehicle having the hybrid system as shown in FIG. 1 drives off, runs at low speed or the like and engine 120 is poor in efficiency, motor generator 140 and motor 140A alone runs the hybrid vehicle, and when the vehicle normally runs, for example power split device 200 splits and thus distributes power of engine 120 to two paths to directly drive driving wheel 160 on one hand and drive generator 140 on the other hand to generate power, which is used to drive motor 140A to assist driving driving wheel 160. Furthermore, when the vehicle runs at high speed, driving battery 220 also supplies power to motor 140A to allow motor 140A to provide an increased output to provide additional power to drive driving wheel 160. In contrast, when the vehicle is decelerated, motor 140A driven by driving wheel 160 acts as a generator to regenerate power which is in turn stored to driving battery 220. Note that if driving battery 220 has a reduced amount of charge and particularly requires charging, the output of engine 120 is increased and the amount of power generated by generator 140B is increased to increase the amount of charge for driving battery 220. It is also a matter of course that engine 120 can be controlled to increase in driverability, as required, when the vehicle runs at low speed, e.g., when driving battery 220 needs to be charged, an air conditioner or a similar accessory is driven, the coolant for engine 120 is increased in temperature to a prescribed temperature, and/or the like.

Furthermore, depending on the vehicle's state of operation, the driving battery 220 state and the like, the hybrid vehicle having the hybrid system as shown in FIG. 1 stops engine 120 to enhance fuel economy. The vehicle's state of operation, the driving battery 220 state and the like thereafter are also detected and engine 120 is restarted. Thus engine 120 is intermittently operated and different in that a conventional vehicle (a vehicle having only an engine mounted therein) having an ignition switch once turned to the START position to start the engine, will not have the engine stopped until the ignition switch is set from the ON position to the ACC position or OFF position.

In the present embodiment engine 120 is stopped to enhance fuel economy and for example if HV_ECU 320 outputs an instruction to engine ECU 280 to stop engine 120 the fuel supplied to engine 120 is immediately interrupted. While the engine is prevented from receiving the fuel, the engine still has an inertial force and its crankshaft's rotation does not immediately stop. As the crankshaft rotates, intake and exhaust valves open and close and engine 120 accordingly takes in air, however the engine is not supplied with fuel and provides lean emission.

In the present embodiment the control device is characterized in that when warming up engine 120 is requested, and cutting the fuel supplied to engine 120 is prohibited and engine 120 is thus operated, and a decision is also made to reduce catalytic odor (achieve a lean air fuel ratio), then prohibiting cutting the fuel is interrupted to cut the fuel to allow exhaust gas to have the lean air fuel ratio. Prohibiting cutting the fuel is interrupted to cut the fuel is controlled by engine ECU 280. It may be done by a different ECU.

Figure 2:
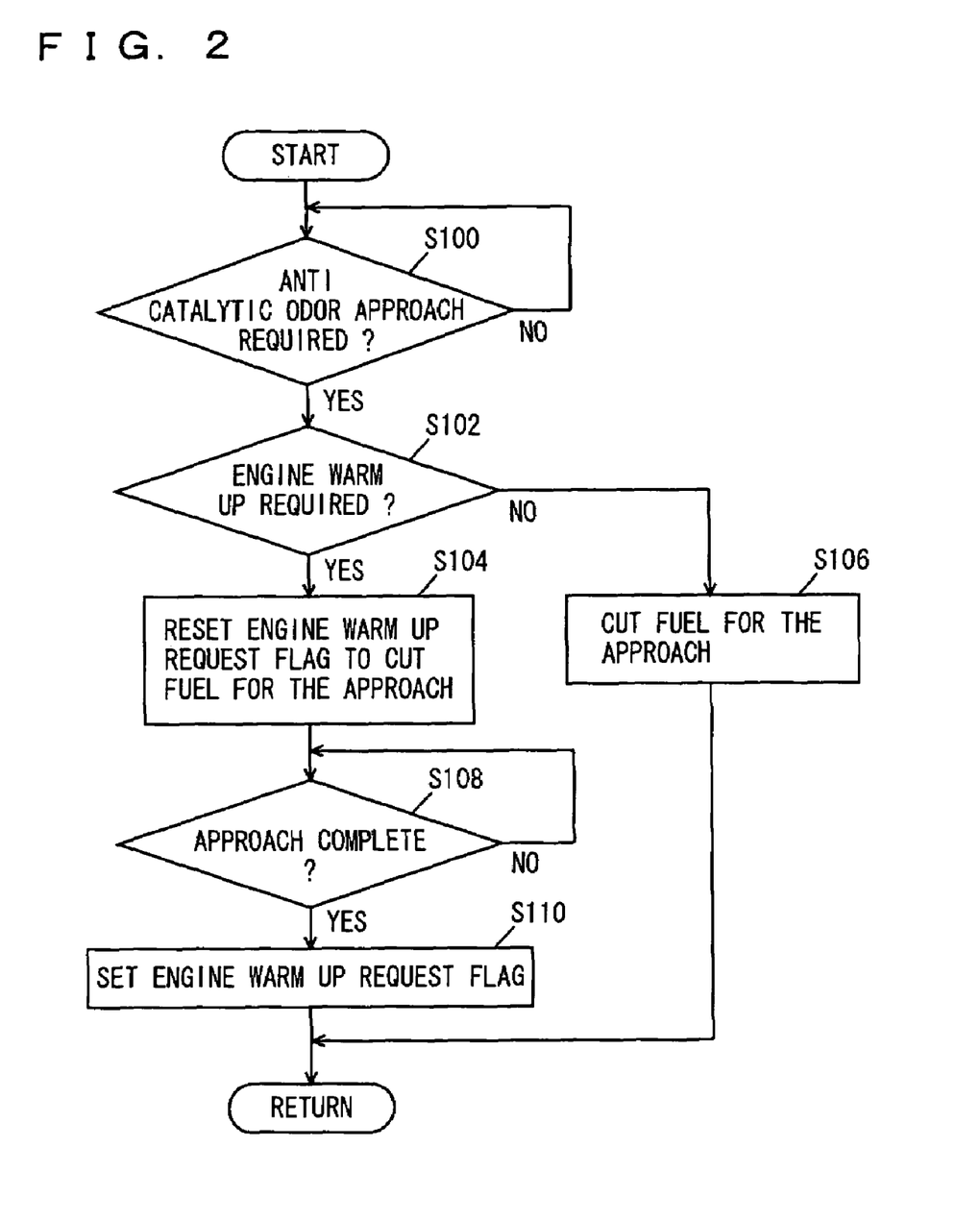
FIG. 2 is a flow chart of a program for control as executed by an engine ECU corresponding to the present control device in the first embodiment.

With reference to FIG. 2 the present embodiment provides a control device implemented by way of example by engine ECU 280 executing a program having a structure for control, as described hereinafter.

At step (S) 100 engine ECU 280 determines whether an anti catalytic odor approach should be taken. Note that when engine 120 is supplied with fuel in amount increased for correction to improve its output, engine 120 provides emission having a rich air fuel ratio. Furthermore, the fuel is also increased in amount for correction to protect three way catalyst 124B against deterioration. More specifically, a lean air fuel ratio reduces an air fuel mixture in specific heat and consequently the air fuel mixture combusts at high temperature, and accordingly three way catalyst 124B has an increased internal temperature, which can be a factor of thermal deterioration. Accordingly, the fuel is increased in amount for correction to allow an air fuel ratio to be rich to protect three way catalyst 124B against thermal deterioration. If such correction is not followed by a sufficient period of time, a decision is made that the approach should be taken and an anti catalytic odor approach flag is set (high, on). If the correction is followed by the sufficient period of time, such decision is not made and the flag is reset (or set low, off). Note that the decision as to whether the approach should be taken or not is not limited to such a decision as described above. If a decision is made that the approach should be taken (YES at S100) the process proceeds to S102. Otherwise, (NO at S100) the process returns to S100.

At S102 engine ECU 120 determines whether the engine should be warmed up. More specifically, engine ECU 120 receives a signal from the engine coolant temperature sensor, and if the signal indicates that the coolant has a temperature lower than a predetermined threshold value engine ECU 120 determines that the engine should be warmed up and the engine warm up request flag is set (high, on), and if the signal indicates that the coolant has a temperature equal to or higher than the predetermined threshold value engine ECU 120 determines that warming up the engine is not required and the flag is accordingly reset (or set low, off). Note that the decision as to whether the engine should be warmed up or not is not limited to such a decision as described above. If the flag is set high, on, and a decision is made that the engine should be warmed up (YES at S102) the process proceeds to S104. Otherwise (NO at S102) the process proceeds to S106.

At S104 engine ECU 120 resets the engine warm up request flag to cut fuel for the anti catalytic odor approach. Thus, rather than warming up the engine, the approach is prioritized and accordingly the fuel is cut to provide lean emission and hence reduced catalytic odor.

At S106 engine ECU 120 cut the fuel to effect the anti catalytic odor approach. Thus if warming up the engine is not requested, a decision is made that the approach is immediately effected, and accordingly the fuel is cut to provide lean emission and hence reduced catalytic odor.

At S108 engine ECU 120 determines whether the approach has completed. More specifically, for example a cumulative value of an amount of air taken in after the fuel is cut is calculated and if the cumulative value exceeds a predetermined value a decision is made that the approach has completed, and if the cumulative value does not exceed the predetermined value a decision is made that the approach still continues. Note that such decision is not limited to that as described above. When a decision is made that the approach has completed (YES at S108) the process proceeds to S110. Otherwise (NO at S108) the process proceeds to S108 and the control awaits until a decision is made that the approach has completed.

At S110 engine ECU 120 sets the reset engine warm up request flag.

Figure 3:
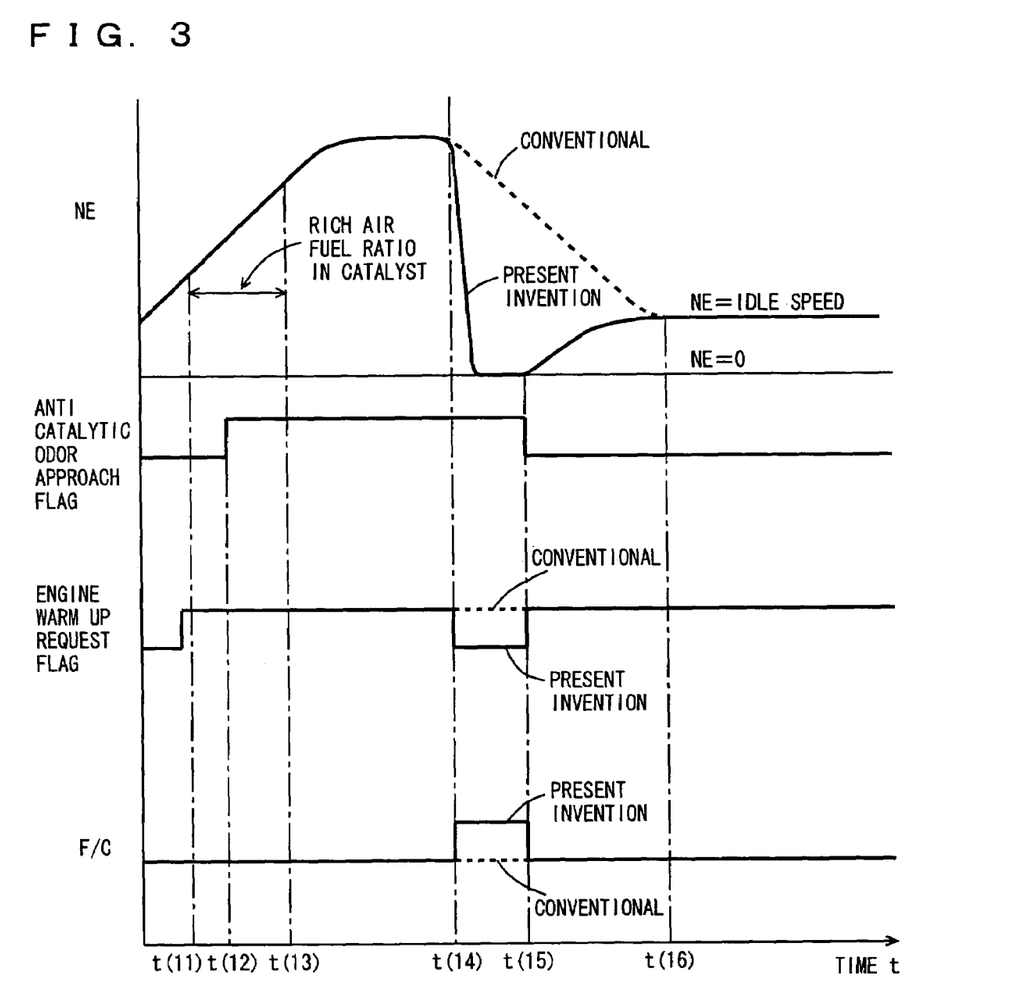
FIG. 3 is timing plots provided when the engine ECU corresponding to the present control device in the first embodiment exerts control.

In accordance with the above described configuration and flow chart the present embodiment's control device or engine ECU 280 controls engine 120 to operate, as will be described hereinafter with reference to FIG. 3 representing timing plots. Note that in the following description with reference to FIG. 3 prior to time t (11) the engine warm up request flag is set (high, on) for the sake of illustration.

If the hybrid vehicle is running for example uphill and the driver presses the accelerator pedal for a period of time t (11) to time t (13) to cause engine 120 to provide an increased output for the sake of illustration, then engine 120 accordingly increases in engine speed NE and thus provides an increased output. In doing so, engine 120 is supplied with fuel increased in amount for correction as corresponding to time t (11) to time t (13).

Thus three way catalyst 124B attains a rich air fuel ratio and the anti catalytic odor approach is accordingly required. Accordingly at time t (12) the anti catalytic odor approach flag is set and a decision is made that the approach should be effected (YES at S100).

When the vehicle has finished running uphill and runs on a flat road or downhill, the driver releases the accelerator pedal and large driving force is no longer required, and cutting the fuel supplied to engine 120 is now allowed. In that condition, the anti catalytic odor approach is required (YES at S100) and warming up the engine is also required (YES at S102). In that case, conventionally, the engine warm up request flag would be set, and prohibiting cutting the fuel is prioritized and the fuel supplied to engine 120 is not cut. As indicated in FIG. 3 at time t (14) to time t (15) by a dotted line, the engine warm up request flag remains set and the fuel is not cut.

In the present invention, in contrast, the engine warm request flag is reset (as indicated in FIG. 3 at time t (14) by a falling solid line segment) to cut the fuel for the anti catalytic odor approach when cutting the fuel supplied to engine 120 is allowed or at time t (13). Thus the fuel supplied to engine 120 is cut (as indicated in FIG. 3 at time t (14) by a rising solid line segment) and three way catalyst 124B attains a lean air fuel ratio to reduce catalytic odor.

Since time t (14) air flow meter 122B detects an amount of air taken in and its cumulative value exceeds a predetermined value a decision is made that a sufficiently lean condition is successfully maintained and that the approach has completed (YES at S108). This corresponds to time t (15). At time t (15) the engine warm up request flag having temporarily been reset is set (S110). Thus in order to warm up engine 120 engine 120 is controlled to operate at idle speed, and from time t (15) resupplied with fuel and gradually increases in engine speed NE and at time t (16) attains idle speed.

Thus the present embodiment provides a control device or an engine ECU such that if an engine warm up request flag is set and the engine thus should be warmed up, and an anti catalytic odor approach flag is also set and an anti catalytic odor approach thus should be taken, then when cutting the fuel supplied to the engine is allowed the engine warm up request flag is once reset (or prohibiting fuel cut to warm the engine is interrupted) to cut the fuel. This allows the three way catalyst to have a lean air fuel ratio and hence provide reduced the catalytic odor. Thereafter if the approach is sufficiently effected then the approach is completed and the engine is resupplied with fuel cut and rotated around idle speed for warm up. Thus if the fuel is temporarily increased in amount and the three way catalyst attains a rich air fuel ratio, prohibiting cutting the fuel can once be interrupted to cut the fuel to allow exhaust gas to have a lean air fuel ratio and hence reduced catalytic odor.

Second Embodiment

The present invention in a second embodiment provides a control device as described hereinafter. The present embodiment also describes controlling a hybrid vehicle having the same block diagram for control as described hereinabove in the first embodiment. Accordingly the block diagram will not be described.

The present embodiment is characterized by timely starting cutting fuel at idle.

Figure 4:
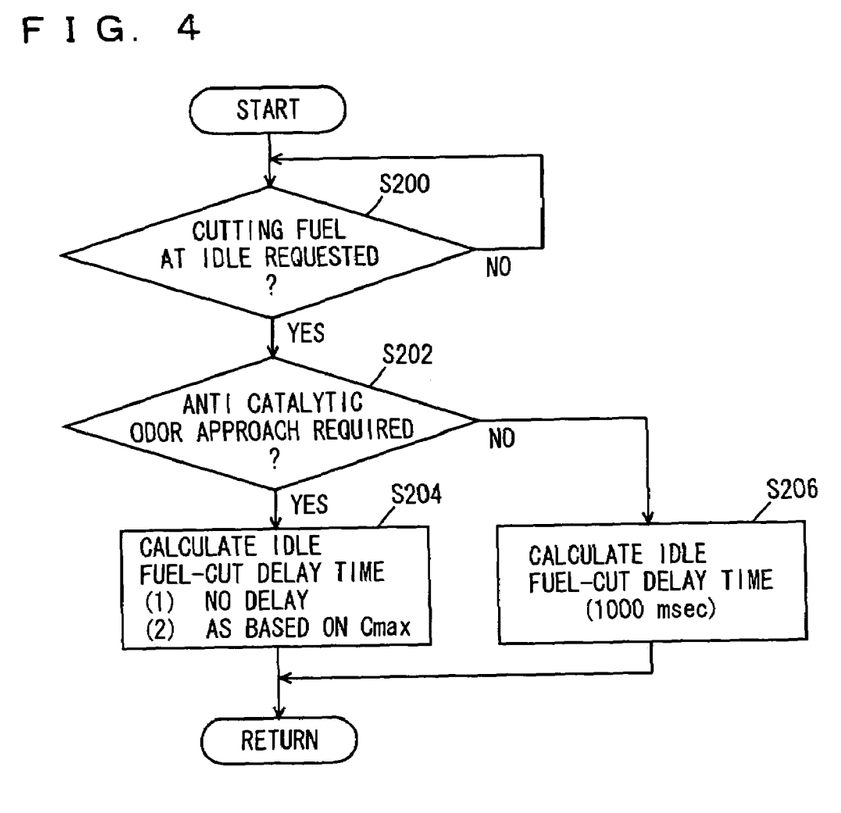
FIG. 4 is a flow chart of a program for control as executed by an engine ECU corresponding to the present control device in a second embodiment.

With reference to FIG. 4 the present embodiment provides a control device implemented by way of example by engine ECU 280 executing a program having a structure for control as described hereinafter.

At S200 engine ECU 280 determines whether there is a request to cut fuel at idle (or when the accelerator pedal is not pressed). This decision is made for example from whether a flag indicative of a request to cut fuel at idle is set or reset, as determined by HV_ECU 320 from a variety of states in amount including those of the vehicle, engine 120 and the like. Note that the decision as to whether there is a request to cut fuel at idle is not limited to such decision as described above. If a decision is made that there is a request to cut fuel at idle (YES at S200) the first proceeds to S202. Otherwise (NO at S200) a process returns to S200 and the control awaits until such request is received.

At S202 engine ECU 280 determines whether an anti catalytic odor approach should be taken. This step is identical to that indicated in FIG. 2 at S100. If engine ECU 280 so determines (YES at S202) the process proceeds to S204. Otherwise (NO at S202) the process proceeds to S206.

Figure 5:
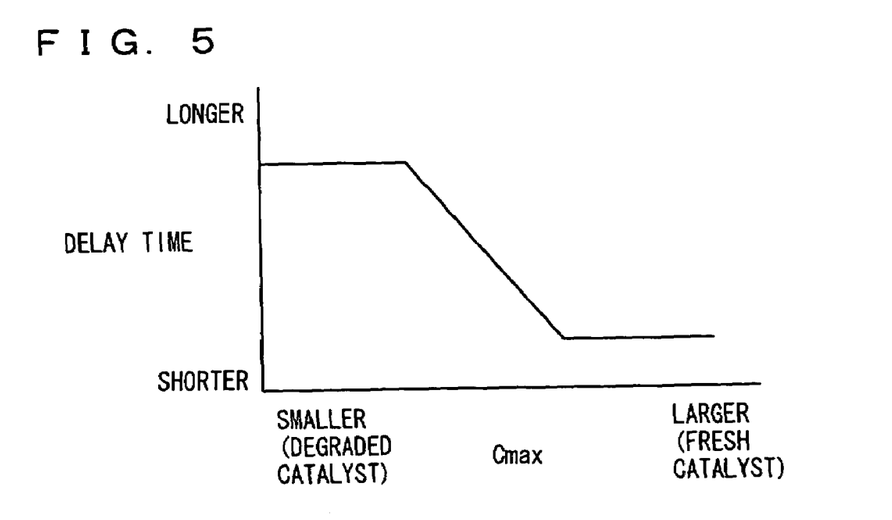
FIG. 5 shows a map stored in the engine ECU corresponding to the present control device in the second embodiment.

At S204 engine ECU 280 calculates idle fuel-cut delay time. In doing so, engine ECU 280 (1) sets no delay time (a delay time=0), (2) calculates delay time based on a degree Cmax in degradation of three way catalyst 124B, or the like. FIG. 5 shows a map used when fuel-cut delay time is calculated as based on degree Cmax. FIG. 5 has a horizontal axis representing degree Cmax. Degree Cmax larger in value indicates a more fresh catalyst and degree Cmax smaller in value indicates a less fresh (or more degraded) catalyst. A more fresh catalyst has a larger ability to store a sulfuric (S) component. Accordingly, a reduced fuel-cut delay time is introduced to more firmly reduce catalytic odor.

At S206 engine ECU 280 calculates an idle fuel-cut delay time for example to be 1,000 msec, which is a period of time longer than that calculated at S204. The fuel-cut delay time calculated at S204 is shorter than that calculated at S206. More specifically, when the anti catalytic odor approach is required, the fuel-cut delay time is calculated to be shorter than when the approach is not required. In contrast, when the approach is not required then to reduce noise and vibration the fuel-cut delay time is calculated to be longer than when the approach is required.

Figure 6:
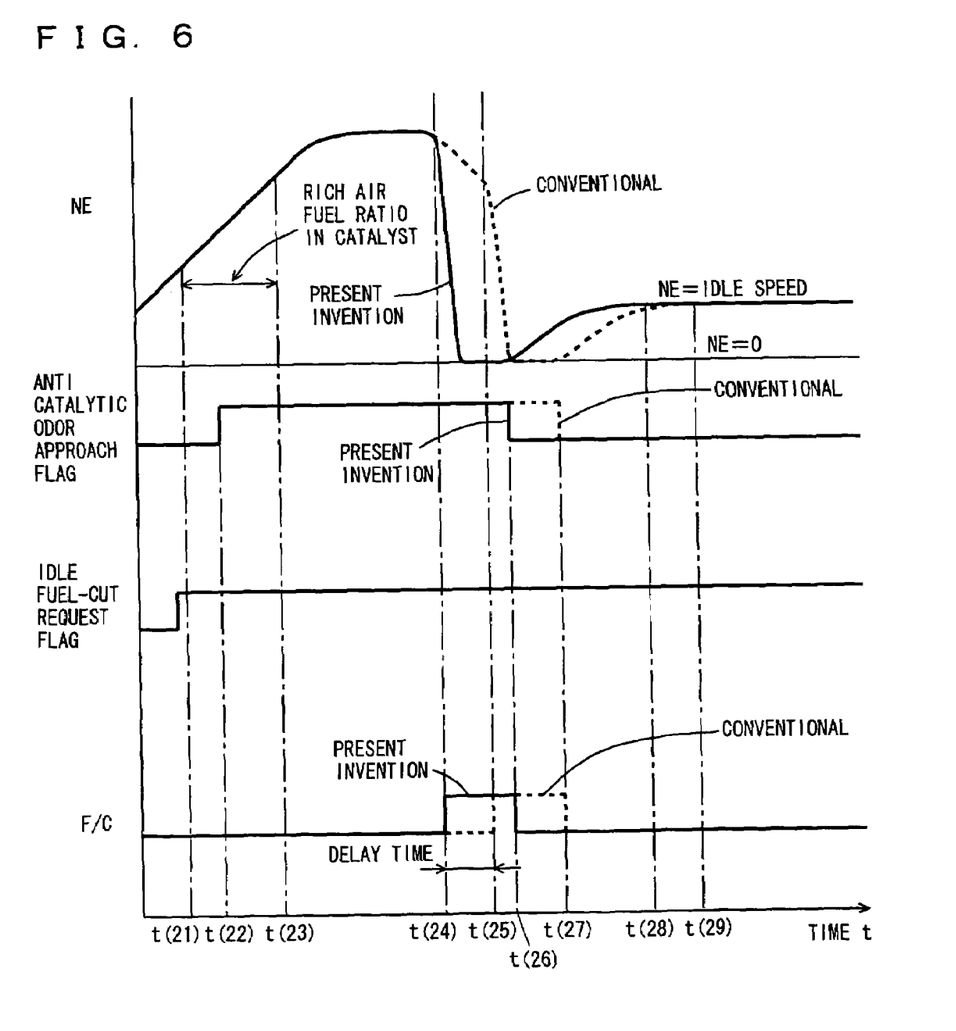
FIG. 6 is timing plots provided when the engine ECU corresponding to the present control device in the second embodiment exerts control.

In accordance with the above described configuration and flow chart the present embodiment's control device or engine ECU 280 controls engine 120 to operate, as will be described hereinafter with reference to FIG. 6 showing timing plots. Note that in the following description with reference to FIG. 6 prior to time t (21) an idle fuel-cut request flag is set (high, on) for the sake of illustration (YES at S200).

If the hybrid vehicle is running for example uphill and the driver presses the accelerator pedal for a period of time t (21) to time t (23) to cause engine 120 to provide an increased output for the sake of illustration, then engine 120 accordingly increases in engine speed NE and thus provides an increased output. In doing so, engine 120 is supplied with fuel increased in amount for correction as corresponding to time t (21) to time t (23).

Thus three way catalyst 124B attains a rich air fuel ratio and the anti catalytic odor approach is accordingly required. Accordingly at time t (22) the anti catalytic odor approach flag is set and a decision is made that the approach should be effected (YES at S202).

When the vehicle has finished running uphill and runs on a flat road or downhill, the driver releases the accelerator pedal and large driving force is no longer required, and cutting the fuel supplied to engine 120 at idle is now allowed (at time t (24)). In that condition, the anti catalytic odor approach is required (YES at S202).

In such a case conventionally from time t (24) a period of time of approximately 1,000 msec is allowed to elapse to delay cutting the fuel and when time t (25) is thus arrived at, the fuel is cut to reduce noise and vibration. As indicated in FIG. 6 at time t (25) to time t (27) by a dotted line, the fuel is cut. Thus engine speed NE first decreases (or electronic throttle valve 122C is closed) and the fuel is then cut, and noise and vibration can be reduced. This is, however, not appropriate as an anti catalytic odor approach.

In the present invention, in contrast, when cutting the fuel with engine 120 at idle is allowed, or at time t (24), the fuel is immediately cut (for no delay time at S204). As indicated in FIG. 6 at time t (24) to time t (26) by a solid line, the fuel is cut. This allows cutting the fuel to be started with electronic throttle valve 122C open, and a large amount of air can be taken into engine 120 within a short period of time. Furthermore, cutting the fuel can be started with engine speed NE high, and a large amount of air can be taken into engine 120 within a short period of time. Thus three way catalyst 124B can rapidly achieve a lean air fuel ratio and an appropriate anti catalytic odor approach can be effected.

Note that in the present invention in stopping engine 120 since time t (24) the motor generator's reverse torque is applied to engine 120 to rapidly reduce engine speed NE.

Thus the present invention provides a control device or an engine ECU such that when an idle fuel-cut request flag is set, cutting the fuel is started with a delay time shorter than conventional. Cutting the fuel starts with the electronic throttle valve open at a large angle and with a high engine speed, and a large amount of air can rapidly be taken into engine 120. Thus the three way catalyst can rapidly achieve a lean air fuel ratio and hence provide reduced catalytic odor. As a result, if the fuel temporarily increased in amount causes the three way catalyst to have a rich air fuel ratio, cutting the fuel is started more rapidly than conventional when cutting the fuel at idle is allowed. This allows emission to rapidly achieve a lean air fuel ratio and catalytic odor to be reduced earlier.

Third Embodiment

Hereinafter the present invention in a third embodiment provides a control device as described hereinafter. The present embodiment also describes controlling a hybrid vehicle having the same block diagram for control as described hereinabove in the first embodiment. Accordingly the block diagram will not be described.

The present embodiment is characterized in that while fuel is cut an amount of air taken in is accumulated to provide a cumulative value and therefrom a decision is made as to whether the fuel should be cut (the engine should be stopped).

Figure 7:
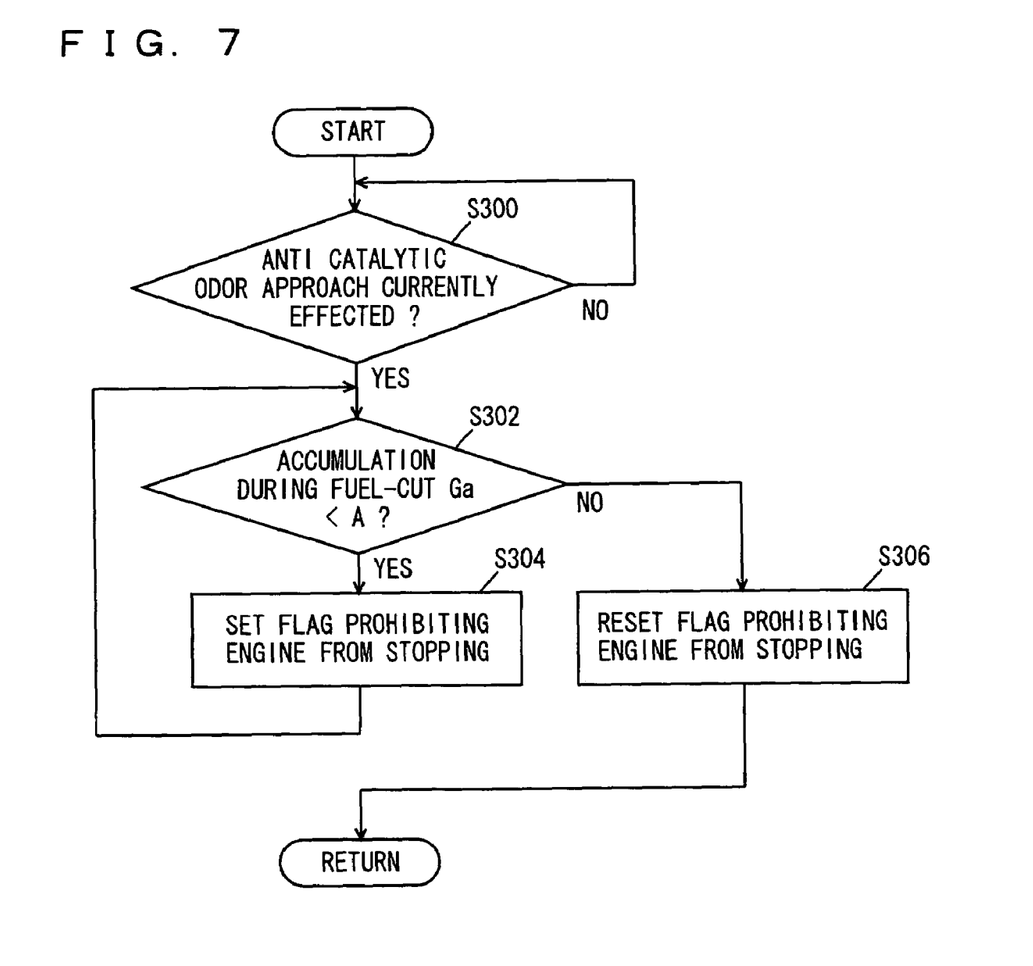
FIG. 7 is a flow chart of a program for control as executed by an engine ECU corresponding to the present control device in a third embodiment.

With reference to FIG. 7 the present embodiment provides the control device implemented by way of example by engine ECU 280 executing a program having a structure for control as described hereinafter.

At S300, as an anti catalytic odor approach should be taken, ECU 280 determines whether the approach is currently effected. In this step, as has been described in the previous embodiment, when the vehicle is running, the fuel supplied to engine 120 is interrupted (or cut) to prevent engine 120 from receiving the fuel, while engine 120 takes in air to allow emission to have a lean air fuel ratio and three way catalyst 124B to have an air fuel ratio varying from rich to lean to reduce catalytic odor ($H_2S$). If a decision is made that the approach is currently effected (YES at S300) the process proceeds to S302. Otherwise (NO at S300) the process returns to S300 and the control awaits until the process corresponding to the approach is effected.

At S302 engine ECU 280 determines whether an amount Ga of air taken in and accumulated while the fuel is cut is smaller than a predetermined threshold value A. More specifically, when cutting the fuel starts, engine ECU 280 starts to accumulate an amount of air (represented in weight) taken in per unit time, as detected by air flow meter 122B, and calculates the obtained cumulative value as amount Ga of air taken in and accumulated while the fuel is cut. Threshold value A is a cumulative value of an amount of air taken in that corresponds to an extent allowing three way catalyst 124B to be devoid of catalytic odor. If amount Ga is smaller than threshold value A (YES at S302) the process proceeds to S304. Otherwise (NO at S302) the process proceeds to S306.

At S304 engine ECU 280 sets a flag prohibiting the engine from stopping. Thus the fuel is continuously cut. Subsequently the process returns to S302 and a decision is made as to whether amount Ga is smaller than threshold value A.

At S306 engine ECU 280 resets the flag. If another condition for stopping engine 120 is established and the flag is also reset, HV_ECU 320 outputs an instruction to engine ECU 280 to stop engine 120. Engine 120 thus stops.

Figure 8:
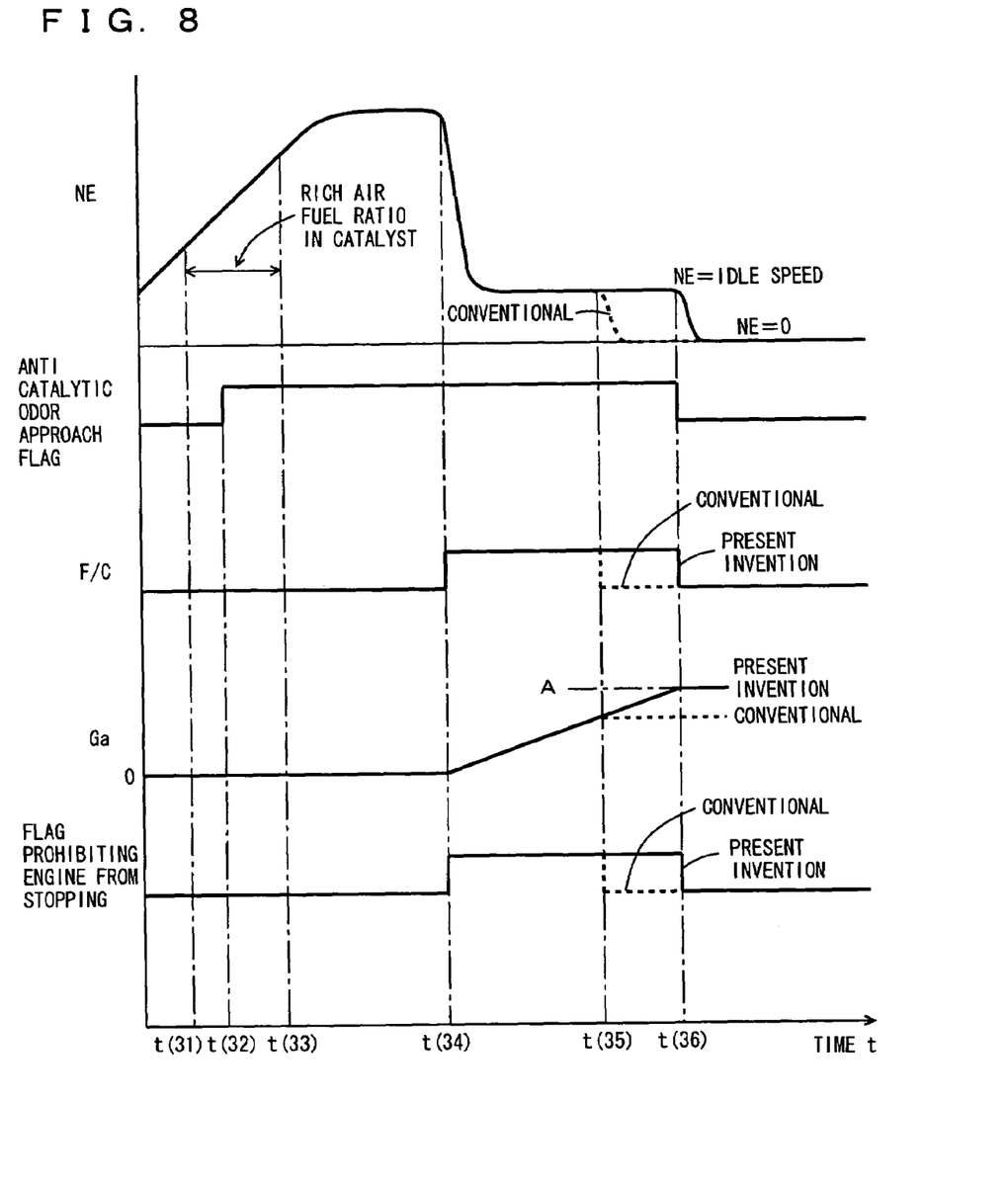
FIG. 8 is timing plots provided when the engine ECU corresponding to the present control device in the third embodiment exerts control.

In accordance with the above described configuration and flow chart the present embodiment's control device or engine ECU 280 controls engine 120 to operate, as will be described hereinafter with reference to FIG. 8 representing timing plots.

If the hybrid vehicle is running for example uphill and the driver presses the accelerator pedal for a period of time t (31) to time t (33) to cause engine 120 to provide an increased output for the sake of illustration, then engine 120 accordingly increases in engine speed NE and thus provides an increased output. In doing so, engine 120 is supplied with fuel increased in amount for correction as corresponding to time t (31) to time t (33).

Thus three way catalyst 124B attains a rich air fuel ratio and the anti catalytic odor approach is accordingly required. Accordingly at time t (32) the anti catalytic odor approach flag is set, and when the vehicle has finished running uphill and runs on a flat road or downhill, the driver releases the accelerator pedal and large driving force is no longer required, and cutting the fuel supplied to engine 120 is now allowed (at time t (34)). At time t (34), cutting the fuel supplied to engine 120 starts (YES at S300) and an amount of air (represented in weight) taken in per unit time, as detected by air flow meter 122B is accumulated and thus calculated as amount Ga of air taken in and accumulated while the fuel is cut. As shown in FIG. 8, amount Ga gradually increases since cutting the fuel is started, or time t (34).

Conventionally, amount Ga is not compared with threshold value A and instead in accordance with how the vehicle runs (e.g., when its speed is lower than 65 km/h) engine 120 is stopped. For example, as shown in FIG. 8, engine 120 is stopped at time t (35). Amount Ga is assumed to be smaller than threshold value A, and before an amount of air sufficient for the anti catalytic odor approach is attained, cutting the fuel is interrupted and engine 120 is stopped (when another condition for stopping the engine is satisfied) (as indicated in FIG. 8 at time t (35) by dotted line segments corresponding to cutting the fuel and the flag prohibiting the engine from stopping). Thus catalytic odor cannot be reduced sufficiently.

In the present invention amount Ga is compared with threshold value A, and if amount Ga attains threshold value A or higher (NO at S302), and engine 120 takes in sufficient air and three way catalyst 124B has an air fuel ratio continuing to be as lean as being devoid of catalytic odor, cutting the fuel is interrupted and engine 120 is stopped (when another condition for stopping the engine is satisfied) (as indicated in FIG. 8 at time t (35) by dotted line segments corresponding to cutting the fuel and the flag prohibiting the engine from stopping). Thus catalytic odor can sufficiently be reduced. Thus three way catalyst 124B can rapidly achieve a lean air fuel ratio and an appropriate anti catalytic odor approach can be effected.

Thus the present embodiment provides a control device or an engine ECU such that when cutting the fuel supplied to the engine is effected as an anti catalytic odor approach an amount of air taken into the engine is accumulated and before such cumulative value reaches an amount sufficient for reducing catalytic odor the engine is not stopped and when the value attains the amount the engine is stopped. The three way catalyst can achieve a sufficiently lean air fuel ratio to provide reduced catalytic odor. As a result, if the fuel is temporarily increased in amount and the three way catalyst accordingly attains a rich air fuel ratio, the fuel can be cut until an amount of air that is sufficient for the approach is taken in. Emission having a sufficiently lean air fuel ratio can thus be provided and reduced catalytic odor ensured.

Fourth Embodiment

The present invention in a fourth embodiment provides a control device as described hereinafter. The present embodiment also describes controlling a hybrid vehicle having the same block diagram for control as described hereinabove in the first embodiment. Accordingly the block diagram will not be described.

The present embodiment is characterized in that if the fuel supplied to engine 120 is increased in amount for correction before engine 120 is stopped, and the vehicle is stopped, engine 120 is once stopped and motored (i.e., rotated by motor generator 140).

Figure 9:
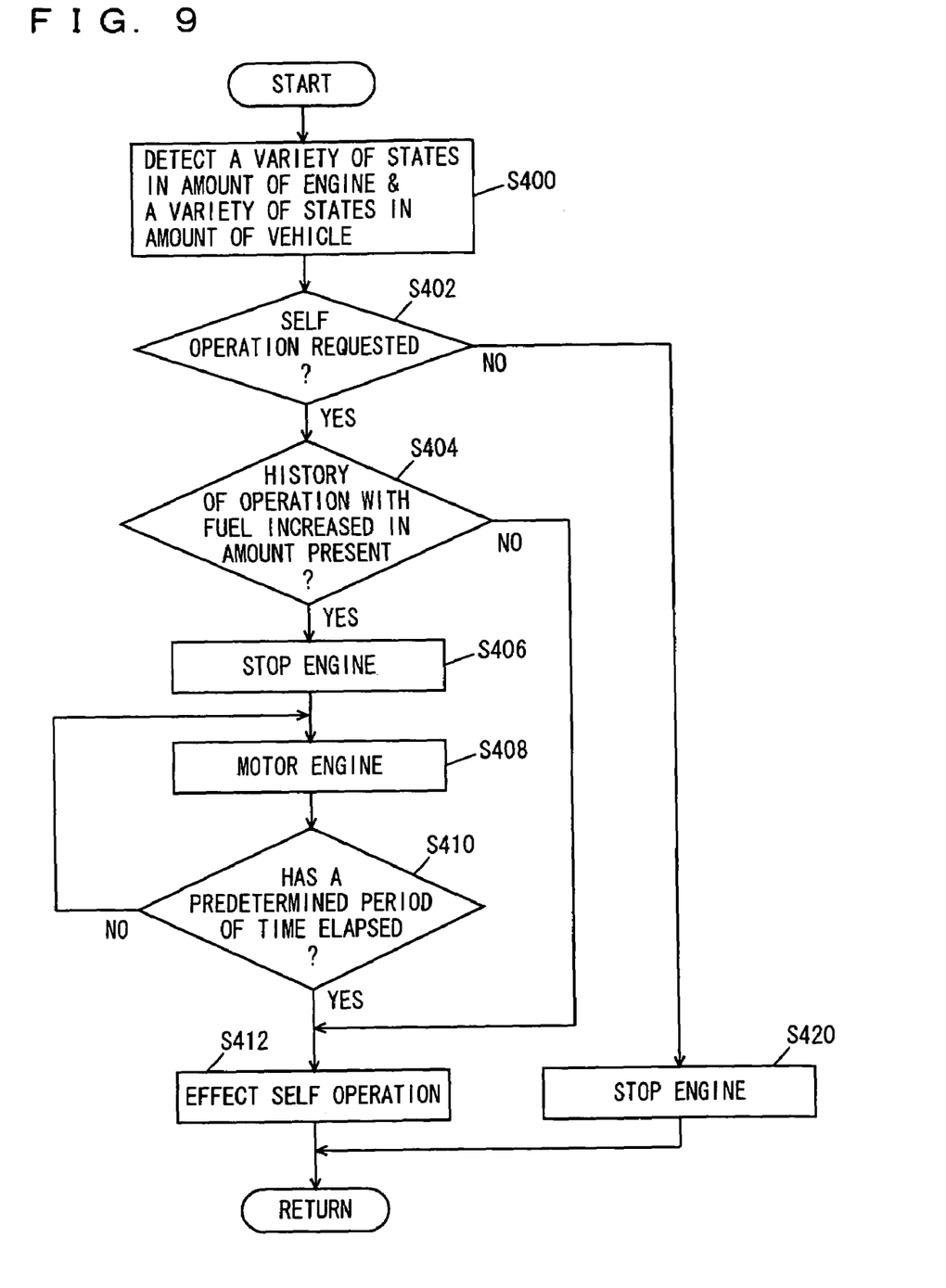
FIG. 9 is a flow chart of a program for control as executed by an engine ECU corresponding to the present control device in a fourth embodiment.

With reference to FIG. 9 the present embodiment provides the control device implemented by way of example by engine ECU 280 executing a program having a structure for control as described hereinafter.

At S400 engine ECU 280 detects a variety of states in amount of engine 120 and a variety of states in amount of the vehicle. More specifically, engine ECU 280 detects engine speed NE of engine 120, the vehicle's speed V, an amount of air taken into engine 120, an amount of fuel supplied to engine 120, an amount of fuel increased for correction to protect three way catalyst 124B against degradation, provide an increased output and the like, an air fuel ratio as detected by air fuel ratio sensor 124A, a temperature of three way catalyst 124B as detected by catalyst temperature sensor 124C, and the like. Furthermore, engine ECU 280 can also detect these detected values' respective variations with time and accumulate these detected values over time to detect their cumulative values over time. Furthermore, engine ECU 280 may be adapted to detect whether a self operation (or idle operation) request flag received from HV_ECU320 is set or reset, whether a flag requesting that the engine should be stopped is set or reset, and the like.

At S402 engine ECU 280 determines whether there is a self operation request. Such decision is made when HV_ECU 320 transmits such request that is set. Furthermore, engine ECU 280 can also so determine when the engine's coolant has a temperature lower than a predetermined value and an engine warm up operation is accordingly required. Furthermore, engine ECU 280 can also so determines when the ISC's learning control is incomplete and self operation is accordingly required. In the following description, the vehicle thereafter is assumed to be stopped. If a decision is made that there is a self operation request (YES at S402) the process proceeds to S404. Otherwise (NO at S404) the process proceeds to S420.

At S404 engine ECU 280 determines whether there exists a history indicating an operation with fuel increased in amount. Preferably, such decision is made when a short period of time elapses after such history. If such decision is made (YES at S404) the process proceeds to S406. Otherwise (NO at S404) the process proceeds to S412.

At S406 engine ECU 280 stops engine 120. Thereafter, supplying engine 120 with fuel is stopped and engine 120 also does not have the crankshaft rotating unless it is motored, as will be described hereinafter.

At S408 engine ECU 280 employs motor generator 140 to motor engine 120. More specifically, engine ECU 280 outputs a request to HV_ECU 320 to cause motor generator 140 to operate as a motor to rotate engine 120.

At S410 engine ECU 280 determines whether a predetermined period of time has elapsed since motoring engine 120 was started. When engine 120 is stopped (or supplying engine 120 with fuel is stopped) and is also motored, engine 120 has the crankshaft rotated and the intake and exhaust valves open and close to introduce air into engine 120. This allows emission to have a lean air fuel ratio and three way catalyst 124B to achieve a lean air fuel ratio to provide reduced catalytic odor. Furthermore, the predetermined period of time is a period of time allowing an amount of air to be supplied that is sufficient to provide reduced catalytic odor. For example, it is set to be a time allowing amount Ga of air taken in and accumulated, as described in the third embodiment, to exceed threshold value A. If a decision is made that the predetermined period of time has elapsed since motoring the engine was started (YES at S410), the process proceeds to S412. Otherwise (NO at S410), the process returns to S408 and the engine is motored until the predetermined period of time elapses.

At S412 engine ECU 280 effects self operation of engine 120 (or an operation thereof at idle). At S420 engine ECU 280 stops engine 120.

If the fuel supplied to the engine is increased in amount for correction, and thereafter an insufficient period of time elapses or the like and accordingly it is necessary to reduce catalytic odor, and there is also a request for self operation, the self operation is not immediately effected and the engine is instead stopped and motored for a predetermined period of time. Thus the three way catalyst can achieve a sufficiently lean air fuel ratio to provide reduced catalytic odor. As a result, if the fuel is temporarily increased in amount and as a result the three way catalyst has a rich air fuel ratio, the engine is motored until an amount of air sufficient for an anti catalytic odor approach is taken in. Emission having a sufficiently lean air fuel ratio can thus be achieved and reduced catalytic odor ensured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicular control device for a vehicle having mounted therein an internal combustion engine with an exhaust manifold provided with a catalytic device cleaning emissions, comprising:
   a fuel supplier supplying said internal combustion engine with fuel;
   a detector detecting that said catalytic device generates catalytic odor and/or a prediction that said catalytic device generates said catalytic odor;
   an interrupter temporarily interrupting said fuel supplied from said fuel supplier;
   a controller controlling said vehicle, as based on whether said interrupter's temporal interruption of said fuel is attributed to said catalytic odor; and
   a determinator determining whether said internal combustion engine should be warmed up, wherein if said determinator determines that said internal combustion engine should be warmed up and temporarily interrupting said fuel is accordingly prohibited, and said interrupter on the other hand currently, temporarily interrupts said fuel, said controller controls said internal combustion engine to prioritize said interrupter temporarily interrupting said fuel.

2. The vehicular control device according to claim 1, wherein said controller controls said internal combustion engine to prioritize said interrupter temporarily interrupting said fuel and delay resupplying said internal combustion engine with said fuel.

3. The vehicular control device according to claim 1, wherein said determinator determines whether said internal combustion engine should be warmed up from a temperature of a coolant of said internal combustion engine.

4. A vehicular control device for a vehicle having mounted therein an internal combustion engine with an exhaust manifold provided with a catalytic device cleaning emissions, comprising:
   a fuel supplier supplying said internal combustion engine with fuel;
   a detector detecting that said catalytic device generates catalytic odor and/or a prediction that said catalytic device generates said catalytic odor;
   an interrupter temporarily interrupting said fuel supplied from said fuel supplier; and
   a controller controlling said vehicle, as based on whether said interrupter's temporal interruption of said fuel is attributed to said catalytic odor, wherein:
   said interrupter temporarily interrupts said fuel a predetermined period of time after a condition for interrupting said fuel is established; and
   if said interrupter's temporary interruption of said fuel is attributed to said catalytic odor, said controller controls said internal combustion engine to reduce said predetermined period of time to be shorter than when said interrupter's temporary interruption of said fuel is not attributed to said catalytic odor.

5. The vehicular control device according to claim 4, further comprising an estimator estimating a degree in degradation of said catalytic device, wherein if said interrupter's temporary interruption of said fuel is attributed to said catalytic odor, said predetermined period of time is set to be shorter for a smaller degree in degradation of said catalytic device.

6. The vehicular control device according to claim 1, wherein said controller controls said internal combustion engine to delay said engine's halt if said interrupter's temporary interruption of said fuel is attributed to said catalytic odor.

7. The vehicular control device according to claim 6, wherein:
   said vehicle further has mounted therein a dynamo-electric machine connected to said internal combustion engine to generate a torque stopping said internal combustion engine from rotating; and
   said controller controls said dynamo-electric machine to delay said internal combustion engine's halt.

8. The vehicular control device according to claim 6, further comprising an air detector detecting an amount of air taken into said internal combustion engine, wherein said controller controls said internal combustion engine to delay said engine's halt in accordance with said amount.

9. The vehicular control device according to claim 8, wherein said controller controls said internal combustion engine to delay said engine's halt until said amount of air accumulated over time exceeds a predetermined value.

10. The vehicular control device according to claim 1, wherein said interrupter temporarily interrupts said fuel until said catalytic odor is no longer generated.

11. The vehicular control device according to claim 1, wherein when said fuel supplied to said internal combustion engine is increased in amount for correction said detector detects that said catalytic device generates said catalytic odor and/or said prediction that said catalytic device generates said catalytic odor.

12. A vehicular control device for a vehicle having mounted therein an internal combustion engine with an exhaust manifold provided with a catalytic device cleaning emissions, comprising:

fuel supply means for supplying said internal combustion engine with fuel;

detection means for detecting that said catalytic device generates catalytic odor and/or a prediction that said catalytic device generates said catalytic odor;

interruption means for temporarily interrupting said fuel supplied from said fuel supply means;

control means for controlling said vehicle, as based on whether said interruption means's temporal interruption of said fuel is attributed to said catalytic odor; and determination means for determining whether said internal combustion engine should be warmed up, wherein said control means includes means for controlling said internal combustion engine to prioritize said interruption means temporarily interrupting said fuel if said determination means determines that said internal combustion engine should be warmed up and temporarily interrupting said fuel is accordingly prohibited, and said interruption means on the other hand currently, temporarily interrupts said fuel.

13. The vehicular control device according to claim 12, wherein said control means includes means for controlling said internal combustion engine to prioritize said interruption means temporarily interrupting said fuel and delay resupplying said internal combustion engine with said fuel.

14. The vehicular control device according to claim 12, wherein said determination means includes means for determining whether said internal combustion engine should be warmed up from a temperature of a coolant of said internal combustion engine.

15. A vehicular control device for a vehicle having mounted therein an internal combustion engine with an exhaust manifold provided with a catalytic device cleaning emissions, comprising:

fuel supply means for supplying said internal combustion engine with fuel;

detection means for detecting that said catalytic device generates catalytic odor and/or a prediction that said catalytic device generates said catalytic odor;

interruption means for temporarily interrupting said fuel supplied from said fuel supply means; and control means for controlling said vehicle, as based on whether said interruption means's temporal interruption of said fuel is attributed to said catalytic odor, wherein:

said interruption means temporarily includes means for interrupting said fuel a predetermined period of time after a condition for interrupting said fuel is established; and said control means includes means for controlling said internal combustion engine to reduce said predetermined period of time to be shorter when said interruption means's temporary interruption of said fuel is attributed to said catalytic odor than when said interruption means's temporary interruption of said fuel is not attributed to said catalytic odor.

16. The vehicular control device according to claim 15, further comprising estimation means for estimating a degree in degradation of said catalytic device, wherein if said interruption means's temporary interruption of said fuel is attributed to said catalytic odor, said predetermined period of time is set to be shorter for a smaller degree in degradation of said catalytic device.

17. The vehicular control device according to claim 12, wherein said control means includes means for controlling said internal combustion engine to delay said engine's halt if said interruption means's temporary interruption of said fuel is attributed to said catalytic odor.

18. The vehicular control device according to claim 17, wherein:

said vehicle further has mounted therein a dynamo-electric machine connected to said internal combustion engine to generate a torque stopping said internal combustion engine from rotating; and said control means includes means for controlling said dynamo-electric machine to delay said internal combustion engine's halt.

19. The vehicular control device according to claim 17, further comprising air detection means for detecting an amount of air taken into said internal combustion engine, wherein said control means includes means for controlling said internal combustion engine to delay said engine's halt in accordance with said amount.

20. The vehicular control device according to claim 19, wherein said control means includes means for controlling said internal combustion engine to delay said engine's halt until said amount of air accumulated over time exceeds a predetermined value.

21. The vehicular control device according to claim 12, wherein said interruption means includes means for temporarily interrupting said fuel until said catalytic odor is no longer generated.

22. The vehicular control device according to claim 12, wherein said detection means includes means for detecting that said catalytic device generates said catalytic odor and/or said prediction when said fuel supplied to said internal combustion engine is increased in amount for correction.

* * * * *